Sept. 1, 1925.
E. R. DRAVER
1,551,810
FEEDER AND OSCILLATING AGITATOR
Filed April 1, 1925
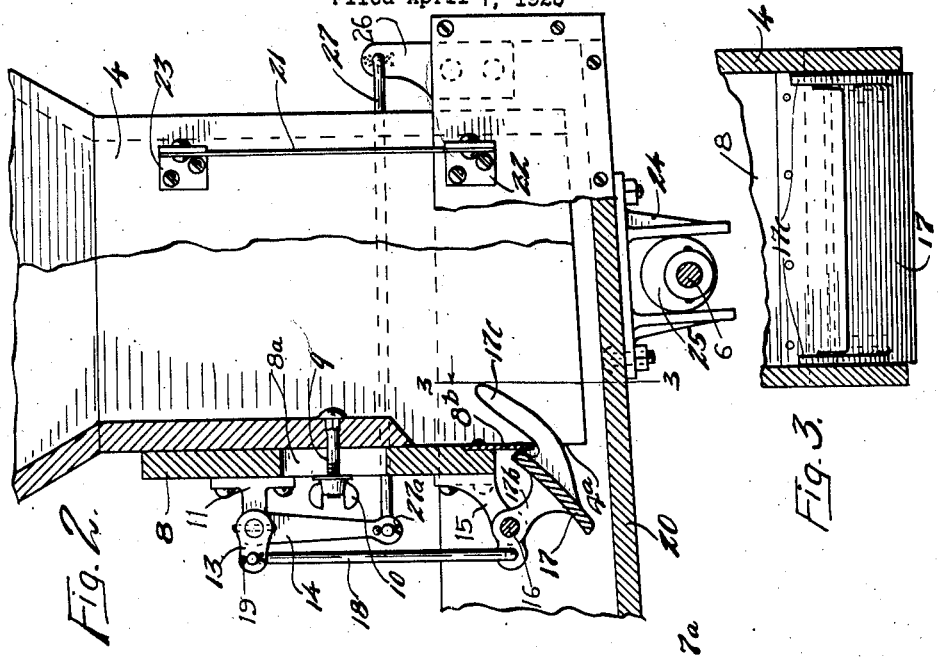
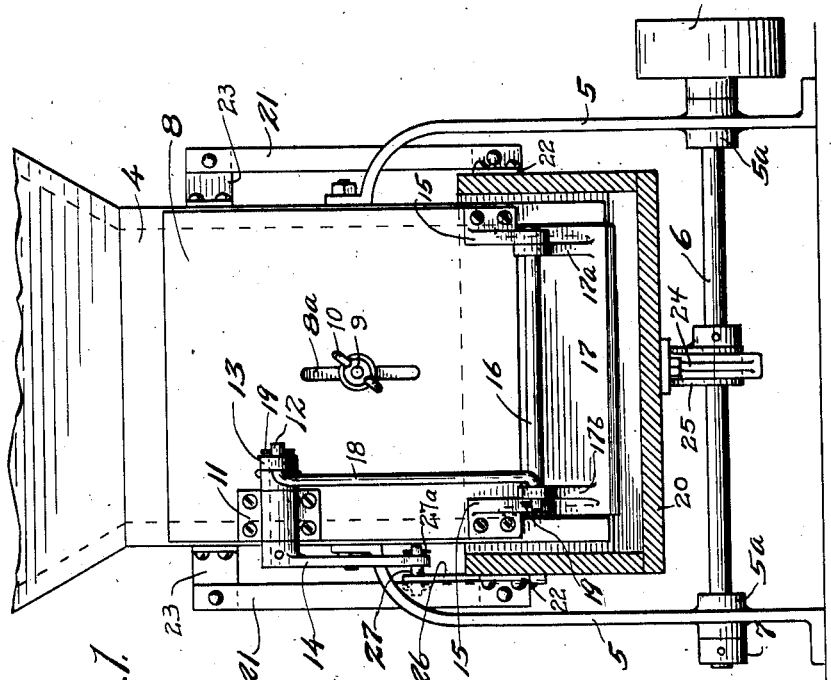
INVENTOR
EMIL R. DRAVER
BY HIS ATTORNEYS Patented Sept. 1, 1925.

1,551,810

UNITED STATES PATENT OFFICE.

EMIL R. DRAVER, OF RICHMOND, INDIANA.

FEEDER AND OSCILLATING AGITATOR.

Application filed April 1, 1925. Serial No. 19,827.

*To all whom it may concern:*

Be it known that I, EMIL R. DRAVER, a citizen of the United States, residing at Richmond, in the county of Wayne and State of Indiana, have invented certain new and useful Improvements in Feeders and Oscillating Agitators; and I do hereby declare the following to be a full, clear, and exact description of the invention, such as will enable others skilled in the art to which it appertains to make and use the same.

This invention relates to a feeding device adapted to feed fine, comminuted or granular material. It has been common to feed such material for various purposes from a hopper having a feed opening and which was provided with a movable gate for regulating the size of said opening. The material is sometimes fed by gravity from the hopper and sometimes fed to a moving member adjacent the feed opening. It has been found that certain materials tend to clog in the feed opening and do not feed uniformly therethrough.

It is an object of this invention, therefore, to provide a hopper having a feed opening and a member for regulating the size thereof, together with movable means disposed adjacent said feed opening for facilitating the feed thereof.

It is a further object of the invention to provide a hopper having a feed opening and a gate for regulating the size of said opening, which gate comprises a reciprocating member extending across the feed opening for effecting uniform feed.

It is another object of the invention to provide a hopper having a feed opening and a gate for regulating the size of said opening comprising a member disposed in or adjacent the opening and extending transversely thereof, which member carries means projecting into the hopper along the sides thereof, together with means for reciprocating said member.

It is a further object of the invention to provide a hopper having a feed opening and a movable member beneath the hopper for receiving the material from said feed opening, said hopper having a gate for regulating the size of said feed opening comprising a member extending across said feed opening transversely of the flow of material, and means operated by a movement of said first mentioned member for operating said last mentioned member.

These and other objects and advantages of the invention will be fully set forth in the following description made in connection with the accompanying drawings in which like reference characters refer to the same parts throughout the different views, and in which, Fig. 1 is a view in front elevation of the device, a portion thereof being shown in vertical section;

Fig. 2 is a view partly in side elevation and partly in central vertical section; and Fig. 3 is a vertical section taken on the line 3—3 of Fig. 2, as indicated by the arrows.

Referring to the drawings, a hopper 4 is shown which may be of any desired size and shape, but which, in the embodiment of the invention illustrated, is shown as substantially rectangular in horizontal cross section and having a flaring upper portion. Said hopper is supported in a frame comprising spaced side members 5 secured to the hopper at their upper ends and having bearings $5^a$ adjacent their base-portions in which is journaled a shaft 6 held in place longitudinally by a collar 7 pinned to one end thereof and by a pulley $7^a$ secured to its other end outward of the bearing $5^a$. The front portion of the hopper 4 is cut away or omitted, as shown at $4^a$, to form a feed opening and a member 8 constituting a gate is slidable vertically at the front of said hopper to regulate the size of opening $4^a$. The gate 8 is provided with a slot $8^a$ through which extends a headed bolt 9 projecting from the front side of hopper 4 and which is equipped with a washer and a thumb or wing nut 10. The nut 10 can be loosened and the gate 8 adjusted, after which the gate can again be held in desired position by tightening nut 10. The gate 8 has a bearing bracket 11 secured thereto adjacent one side in which is journaled a shaft 12 projecting at the ends of bearing 11 and having secured to one end a short arm 13 and having secured to its other and outer end a longer arm 14. The gate also carries adjacent its lower edge a pair of brackets 15 disposed, respectively, at each side thereof. A shaft 16 is secured in brackets 15 and extends therebetween, and a member 17 is provided having arms $17^a$ and $17^b$ projecting therefrom, said arms being apertured and journaled on shaft 16. While the member 17 may have various forms, in the embodiment of the invention illustrated, the same is shown as plate-like in formation slightly curved and said member has projecting from its rear side, means in the form of a pair of fingers 17ᶜ which project into the hopper 4 and are disposed adjacent the side walls thereof. The gate 8 also carries at its inside bottom edge a plate 8ᵇ projecting below the upper inside edge of member 17. The arm 17ᵇ has a short extension projecting outwardly in front of shaft 16 apertured to receive the lower end of a link 18, the upper end of which is pivotally connected to the outer end of arm 13 which is apertured to receive the same. The link 18 is shown as a round rod bent at right angles at its ends to extend in opposite directions, said ends passing, respectively, through the arms 13 and 17ᵇ and being held in place by suitable means such as the cotter pins 19 shown. Disposed below the hopper 4 is a movable member 20. While this member may be of various forms, in the embodiment of the invention illustrated, the same is shown as a trough or chute of rectangular shape. Said member 20 is supported by flexible straps or springs 21 secured at their lower ends to brackets 22 attached to the sides of member 20 and at their upper ends to bracket 23 attached to the sides of hopper 4. The member 20 is adapted to be moved or reciprocated and while various instrumentalities might be used for this purpose, in the embodiment of the invention illustrated, said member is shown as having a bracket 24 secured to its under side substantially centrally thereof having spaced downwardly extending arms between which is disposed an eccentric 25 secured to and driven by the shaft 6. The member 4 also has adjacent its rear end at one side thereof an upstanding bracket 26 in which is pivotally secured the rear end of a link 27 extending along one side of hopper 4 and pivotally secured at its other end to the lower end of arm 14. The link 27 is also shown as a round rod bent in opposite directions at its ends substantially at right angles, said ends, respectively, passing through the bracket 26 and arms 14 and held therein by suitable means, such as cotter pins 28.

In operation, material will be supplied to hopper 4 and power will be applied to pulley 7 through a suitable belt. Eccentric 25 will thus be operated and a longitudinal swinging or reciprocating motion will be given to the member 20. Material will feed from hopper 4 downwardly through opening 4ᵃ and along the bottom of member 20. As member 20 is reciprocated, motion will be transmitted thereby through the link 27 to the arm 14, thence through arm 13 to link 18. Said link 18 will reciprocate or oscillate the member 17 on shaft 16. The member 17, as clearly shown, is disposed in or adjacent the feed opening 4ᵃ and will effectively prevent any clogging of the material. The plate 8ᵇ prevents the material working over or spilling over the top of member 17. The material tends to clog most adjacent the sides of hopper 4 and for this purpose the fingers 17ᶜ are provided which move close to said sides. The action of these fingers will keep the material from clogging, or being retarded at the sides of the hopper so that feed of material will be uniform throughout the entire extent of the feed opening. It will be noted that the member 17 really comprises a portion of the feed gate and it will also be noted that the feed gate 8 can be raised and lowered, as desired, without interference with the action of the member 17.

From the above description it is seen that applicant has provided a very simple and efficient device for maintaining a uniform feed of material through a feed opening. The device is quite simple and can readily be applied to practically all hoppers having a feed opening and a movable member operating adjacent thereto. The device comprises few parts and requires practically no attention for maintenance. A battery of feeders embodying the present invention can be arranged together and the means for controlling the size of the feed opening regulated as disclosed in applicant's prior patent granted December 30, 1924, No. 1,521,014.

It will, of course be understood that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. A device for feeding fine or granular material having in combination, a hopper having a discharge opening and a member movable to adjust the size of said opening, comprising a driven reciprocating member extending into said opening for facilitating the flow of said material.

2. A device for feeding fine or granular material having in combination, a hopper having a discharge opening, and a member movable to adjust the size of said opening carrying a driven oscillating member for causing a uniform feed of material through said feed opening.

3. A device for feeding fine or granular material having in combination, a hopper having a discharge opening, a member movable to adjust the size of said opening, a member extending across said feed opening, means for reciprocating said last mentioned member, and means projecting from said last mentioned member into said hopper adjacent the sides thereof.

4. A feeding device for fine or granular material having in combination, a hopper having a discharge opening, means for regulating the size of said opening, a member movable beneath said hopper, means for reciprocating said member, a member extending transversely of and into said discharge opening, and means connected to said first mentioned member for reciprocating said last mentioned member to cause a uniform feed of material through said feed opening.

5. A device for feeding fine or granular material having in combination, a hopper having a discharge opening, means for regulating the size of said opening, a member extending across said feed opening transversely of the flow of material, means for reciprocating said last mentioned member, and fingers extending from said last mentioned member and projecting into said hopper along the sides thereof.

6. A feeding device for fine or granular material having in combination, a hopper having a discharge opening, means for regulating the size of said opening, a reciprocating member closely adjacent the bottom of said hopper for causing the feed of material therefrom, a member disposed between said means and said reciprocating member and in said discharge opening, and means for reciprocating said last mentioned member.

7. A feeding device comprising a hopper having an open bottom, a reciprocating trough closely adjacent said bottom, said hopper having one side cut away at its lower portion to form a discharge opening, a gate movable along said side for adjusting the size of said discharge opening, a member disposed in and extending across said discharge opening, and means for positively reciprocating said last mentioned member to facilitate the feed of material through said discharge opening.

In testimony whereof I affix my signature.

EMIL R. DRAVER.